(12) United States Patent
Rösel et al.

(10) Patent No.: US 7,499,792 B2
(45) Date of Patent: Mar. 3, 2009

(54) DIAGNOSTIC METHOD FOR AN EXHAUST GAS PROBE AND DIAGNOSTIC DEVICE FOR AN EXHAUST GAS PROBE

(75) Inventors: Gerd Rösel, Regensburg (DE); Norbert Sieber, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 11/731,892

(22) Filed: Mar. 30, 2007

(65) Prior Publication Data

US 2007/0244621 A1  Oct. 18, 2007

(30) Foreign Application Priority Data

Mar. 30, 2006 (DE) .................. 10 2006 014 916

(51) Int. Cl.
*G06F 19/00* (2006.01)
(52) U.S. Cl. ...................... 701/114; 701/109
(58) Field of Classification Search ............... 701/114, 701/108, 109, 101, 102; 60/274, 276, 285
See application file for complete search history.

(56) References Cited

FOREIGN PATENT DOCUMENTS

| DE | 43 31 153 A1 | 3/1994 |
| DE | 198 28 929 A1 | 1/2000 |
| EP | 1 437 501 A1 | 7/2004 |
| FR | 2 895 448 A1 * | 6/2007 |

* cited by examiner

*Primary Examiner*—Hieu T Vo

(57) ABSTRACT

An exhaust gas probe is disposed downstream of a catalytic converter in an exhaust gas tract of an internal combustion engine. A first quality value which is representative of a signal dynamic of the measured signal of the exhaust gas probe is determined as a function of the measured signal of the exhaust gas probe. If the first quality value represents at least one predefined signal dynamic, the exhaust gas probe is diagnosed as functioning correctly. If the first quality value does not represent at least the predefined signal dynamic, a catalytic converter diagnosis is performed comprising a loading with oxygen and/or an emptying of oxygen with at least two different air/fuel ratios. Dependent on the catalytic converter diagnosis, the exhaust gas probe is diagnosed as functioning either correctly or incorrectly.

14 Claims, 5 Drawing Sheets

DIAGNOSTIC METHOD FOR AN EXHAUST GAS PROBE AND DIAGNOSTIC DEVICE FOR AN EXHAUST GAS PROBE

CROSS REFERENCE TO RELATED APPLICATIONS

This application claims priority of German application No. 10 2006 014 916.5 filed Mar. 30, 2006, which is incorporated by reference herein in its entirety.

FIELD OF INVENTION

The invention relates to a diagnostic method and a diagnostic device for an exhaust gas probe in an exhaust gas tract of an internal combustion engine, the exhaust gas probe being disposed downstream of a catalytic converter in the exhaust gas tract.

BACKGROUND OF THE INVENTION

Increasingly stringent statutory regulations in relation to permissible pollutant emissions of motor vehicles in which internal combustion engines are disposed make it necessary to keep said pollutant emissions to an absolute minimum during the operation of the internal combustion engine. This can be realized on the one hand by reducing the pollutant emissions that are produced during the combustion of the air/fuel mixture in the respective cylinder of the internal combustion engine. On the other hand exhaust gas aftertreatment systems are used in internal combustion engines, said exhaust gas aftertreatment systems converting the pollutant emissions generated during the combustion process of the air/fuel mixture in the respective cylinders into innocuous substances. For this purpose catalytic converters are used which convert the carbon monoxide, hydrocarbons and nitrogen oxides into innocuous substances. Both the targeted influencing of the generation of the pollutant emissions during combustion and the converting of the pollutant components with a high degree of efficiency by means of an exhaust gas catalytic converter require a very precisely adjusted air/fuel ratio in the respective cylinder.

In this connection it must be ensured that the components of the exhaust gas aftertreatment system also operate in the desired manner over a long service life and that faults are reliably detected.

In this connection it is also important that faults in sensors, such as, for example, exhaust gas probes, are accurately and reliably detected.

SUMMARY OF INVENTION

The object of the invention is to create a diagnostic method and a diagnostic device for an exhaust gas probe, which diagnostic device is positioned downstream of a catalytic converter of an exhaust gas tract of an internal combustion engine, and which method and diagnostic device are both simple and reliable.

The object is achieved by the features of the claims. Advantageous embodiments of the invention are characterized in the claims.

The invention is characterized by a diagnostic method and a corresponding diagnostic device for an exhaust gas probe, said diagnostic device being positioned downstream of a catalytic converter in an exhaust gas tract of an internal combustion engine. A first quality value that is representative of a signal dynamic of the measured signal of the exhaust gas probe is determined as a function of the measured signal of the exhaust gas probe. If the first quality value represents at least one predefined signal dynamic, the exhaust gas probe is diagnosed as functioning correctly. This is based on the knowledge that during the typical operation of the internal combustion engine changes frequently take place between a rich and a lean air/fuel mixture and vice versa, and, moreover, that said changes take place in an erratic form. Accordingly, in the case of a correctly functioning exhaust gas probe the latter's measured signal then exhibits a corresponding signal dynamic and specifically in particular when the catalytic converter is completely emptied in respect of the oxygen that can be stored therein or also when its oxygen store is fully loaded. Typically, as a catalytic converter ages its oxygen storage capacity also decreases and consequently during the typical operation of the internal combustion engine and with a correctly functioning exhaust gas probe the latter's signal dynamic then increases. The first quality value can thus be very easily determined, in particular during the normal operation of the internal combustion engine, without further interventions into its operation. Accordingly, on the basis of the first quality value at least one correctly functioning exhaust gas probe downstream of the catalytic converter can be very easily diagnosed, in particular in the case of a diminished oxygen storage capacity of the catalytic converter.

If the first quality value does not represent at least the predefined signal dynamic, a catalytic converter diagnosis is performed. This entails loading the catalytic converter with oxygen and/or emptying it of oxygen with at least two different air/fuel ratios. Dependent on the catalytic converter diagnosis, the exhaust gas probe is then diagnosed as functioning either correctly or incorrectly. In this way it is then possible if, based on the first quality value, the exhaust gas probe cannot yet be diagnosed as functioning correctly, by means of the downstream catalytic converter diagnosis to reach a conclusion on whether the exhaust gas probe is functioning correctly or incorrectly. As a result of providing two different air/fuel ratios an influence of a change in the oxygen storage capacity of the catalytic converter can additionally be separated from the response behavior of the exhaust gas probe.

According to an advantageous embodiment of the invention the first quality value is determined as a function of a gradient of the measured signal of the exhaust gas probe. The gradient of the measured signal of the exhaust gas probe can be particularly easily determined, in particular concurrently, during the normal operation of the internal combustion engine, e.g. for a selectable time interval.

According to a further advantageous embodiment of the invention the first quality value is determined in relation to the signal dynamic of the measured signal of the exhaust gas probe for a transition of the measured signal which is representative of a transition from lean to rich of the air/fuel ratio sensed by the exhaust gas probe. This is advantageous in particular because until now there were no possibilities available for diagnosing, in particular reliably diagnosing, the exhaust gas probe with regard to this transition from lean to rich of the air/fuel ratio sensed by the exhaust gas probe.

According to a further advantageous embodiment of the invention, a reference air/fuel ratio is determined by modulating a forced stimulation signal onto a stoichiometric air/fuel ratio, with an amplitude of the forced stimulation signal being set to a first amplitude value and a frequency of the forced stimulation signal being set to a first frequency for the purpose of setting the first air/fuel ratio during the catalytic converter diagnosis. In order to set the second air/fuel ratio during the catalytic converter diagnosis, the amplitude of the forced stimulation signal is set to a second amplitude value and the frequency of the forced stimulation signal is set to a second frequency. A product of the first amplitude and the first frequency is equal to a product of the second amplitude and the second frequency. In this way the catalytic converter diagnosis can be performed particularly easily, since a forced stimulation is provided in any case as part of a possible oxygen sensor emission control arrangement.

It is particularly advantageous if the measured signal of the exhaust gas probe is evaluated in the course of the catalytic converter diagnosis. In this way the measured signal associated with the component that is to be diagnosed will then also be evaluated.

In this connection it is also particularly advantageous if the measured signal of the exhaust gas probe is integrated in relation to a reference value in the course of the catalytic converter diagnosis. In this way the diagnosis can be performed particularly precisely, in particular with regard to a possible noise of the measured signal of the exhaust gas probe or also of possible individual erroneous measured values.

The reference value is preferably suitably selected in such a way that it roughly corresponds to the typical measured signal in the case of a stoichiometric air/fuel ratio.

In this connection it is also advantageous if, in the course of the catalytic converter diagnosis, the measured signal of the exhaust gas probe is integrated in relation to the reference value, with a temperature of the exhaust gas in the exhaust gas tract being taken into account. In this way the diagnosis can be performed even more precisely, since the oxygen storage capacity of the catalytic converters is dependent on the exhaust gas temperature.

According to a further advantageous embodiment of the invention a second quality value is determined in relation to the first air/fuel ratio in the course of the catalytic converter diagnosis. A third quality value is determined in relation to the second air/fuel ratio. Dependent on the second and third quality value the exhaust gas probe is diagnosed as functioning either correctly or incorrectly. In this way a particularly high correlation of the diagnosis can be ensured with regard to the behavior of the exhaust gas probe, and consequently an extremely precise diagnosis of the exhaust gas probe.

BRIEF DESCRIPTION OF THE DRAWINGS

Exemplary embodiments of the invention are explained in the following with reference to the schematic drawings, in which.

Elements of identical construction or function are identified by the same reference symbols throughout the figures.

DETAILED DESCRIPTION OF INVENTION

Figure 1:
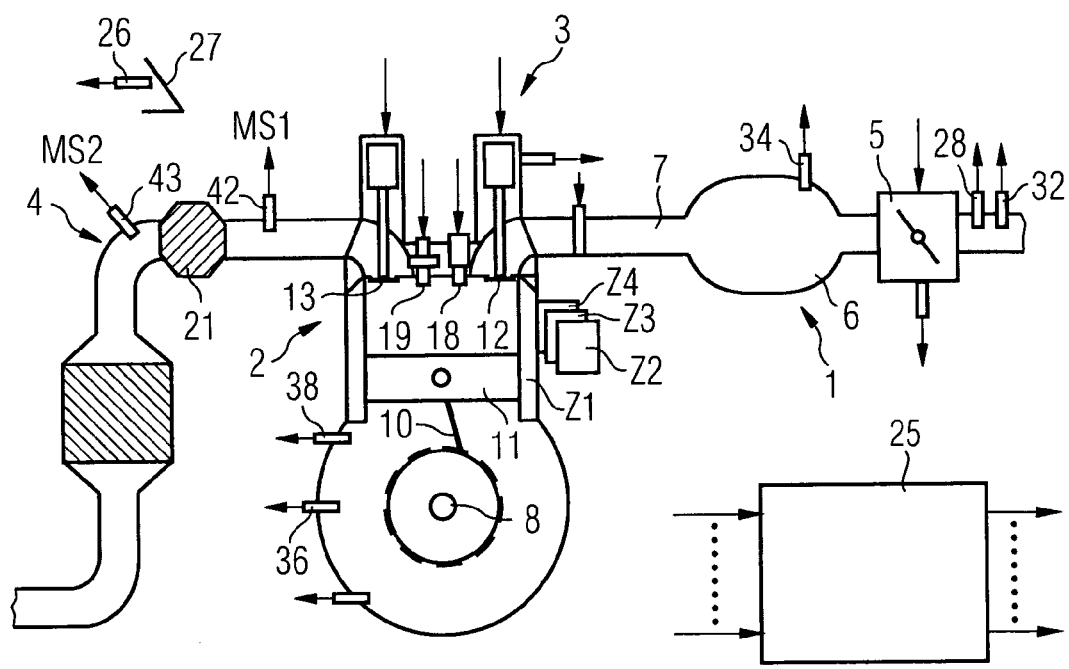
FIG. 1 shows an internal combustion engine.

An internal combustion engine (FIG. 1) comprises an intake tract 1, an engine block 2, a cylinder head 3 and an exhaust-gas tract 4. The intake tract 1 preferably comprises a throttle valve 5, as well as a manifold 6 and an intake pipe 7 which is routed to a cylinder Z1 by way of an inlet port into the engine block 2. The engine block 2 further comprises a crankshaft 8 which is coupled to the piston 11 of the cylinder Z1 by way of a connecting rod 10.

The cylinder head 3 comprises a valve train assembly with a gas inlet valve 12 and a gas outlet valve 13.

The cylinder head 3 further comprises an injection valve 18 and a spark plug 19. Alternatively the injection valve 18 can also be disposed in the intake pipe 7.

Disposed in the exhaust gas tract is a catalytic converter 21 which is preferably embodied as a three-way catalytic converter. It can also be embodied as a NOx catalytic converter. A NOx catalytic converter can also be provided in addition to the three-way catalytic converter. There can also be more than one three-way catalytic converter present.

A control device 25 is provided to which sensors are assigned which record different measured variables and in each case determine the value of the measured variable. Operating variables include measured variables and variables derived therefrom.

As a function of at least one of the operating variables the control device 25 determines actuating variables which are then converted into one or more actuating signals for controlling the actuating elements by means of corresponding actuating drives. The control device 25 can also be designated as a diagnostic device.

The sensors are a pedal position sensor 26 which records a pedal position of an accelerator pedal 27, a mass air flow sensor 28 which records a mass air flow upstream of the throttle valve 5, a first temperature sensor 32 which records an intake air temperature, an intake pipe pressure sensor 34 which records an intake pipe pressure in the manifold 6, a crankshaft angle sensor 36 which records a crankshaft angle to which a rotational speed is then assigned, and a second temperature sensor 38 which records a coolant temperature.

Also provided is an exhaust gas probe 42 which is disposed upstream of the catalytic converter 21 or in the catalytic converter 21 and which records a residual oxygen content of the exhaust gas and whose measured signal MS1 is characteristic of the air/fuel ratio in the combustion chamber of the cylinder Z1 and upstream of the first exhaust gas probe prior to the oxidation of the fuel, referred to in the following as the air/fuel ratio in the cylinders Z1-Z4.

Also provided is a second exhaust gas probe 43 which is disposed downstream of the catalytic converter 21 and which records a residual oxygen content of the exhaust gas and whose measured signal MS2 is characteristic of the air/fuel ratio in the combustion chamber of the cylinder Z1 and upstream of the second exhaust gas probe 43 prior to the oxidation of the fuel, referred to in the following as the air/fuel ratio downstream of the catalytic converter 21.

The first exhaust gas probe 42 is preferably a linear lambda probe. The second exhaust gas probe 43 is a binary lambda probe. It can, however, also be a linear lambda probe.

Depending on the embodiment of the invention, an arbitrary subset of the aforesaid sensors may be present or additional sensors may also be present.

The actuating elements are, for example, the throttle valve 5, the gas inlet and gas outlet valves 12, 13, the injection valve 18 or the spark plug 19.

Preferably also provided in addition to the cylinder Z1 are further cylinders Z2 to Z4 to which corresponding actuating elements and, where appropriate, sensors are then also assigned.

Figure 2:
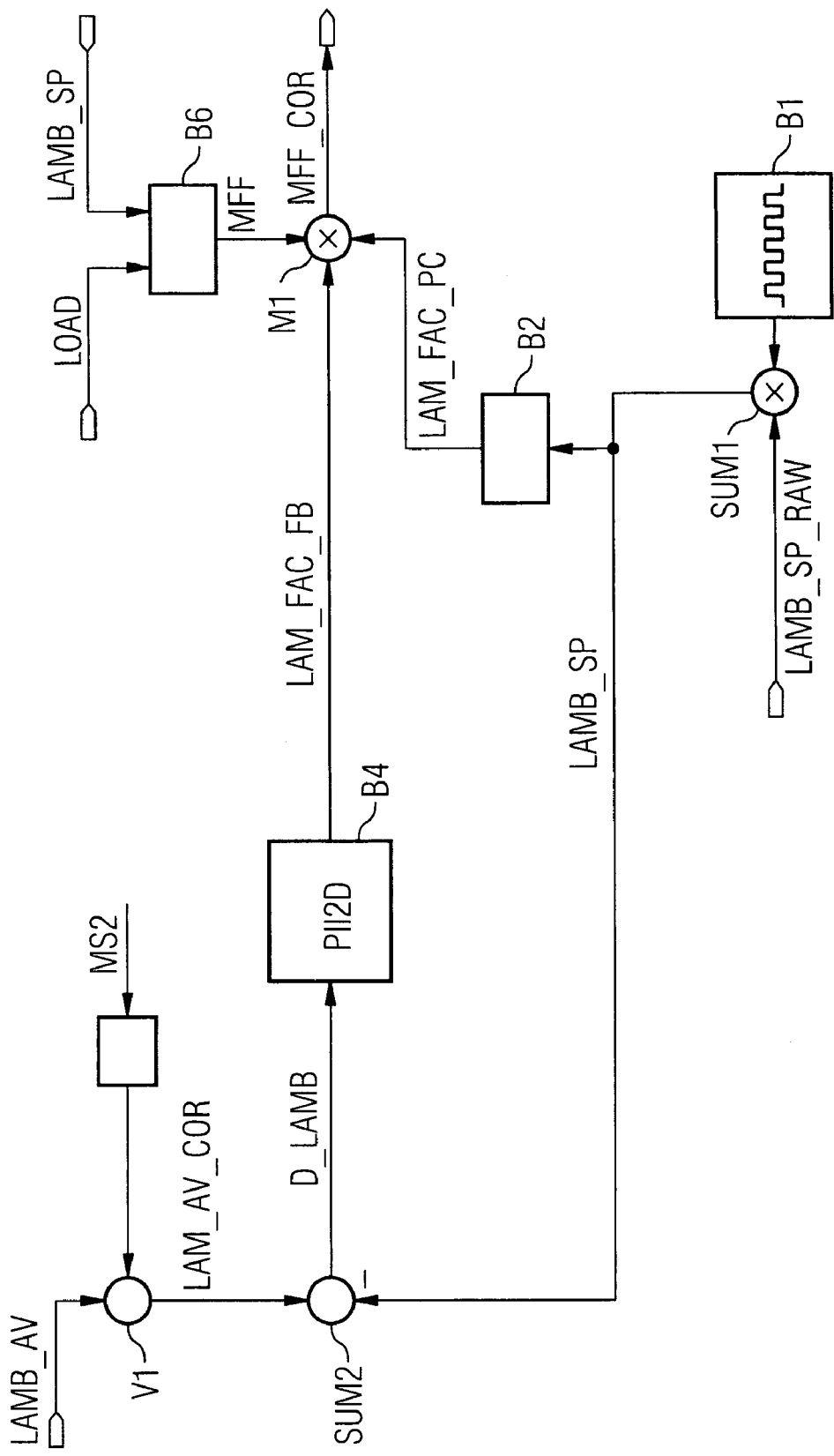
FIG. 2 is a block diagram of a part of a control device of the internal combustion engine.

A block diagram of a part of the control device 25 is shown in FIG. 2. In a particularly simple embodiment a predefined raw air/fuel ratio LAMB_SP_RAW can be specified as a fixed value. Preferably, however, it is determined for example as a function of the current operating mode of the internal combustion engine, such as a homogeneous mode of operation or a shift mode of operation and/or as a function of operating variables of the internal combustion engine. In particular the predefined raw air/fuel ratio LAMB_SP_RAW can be specified as approximately the stoichiometric air/fuel ratio.

A forced stimulation is determined in a block B1 and summed in the first summation point SUM1 with the predefined raw air/fuel ratio LAMB_SP_RAW. The forced stimulation is a quasi-rectangular signal. The output variable of the summation point is then a predefined air/fuel ratio LAMB_SP in the combustion chambers of the cylinders Z1 to Z4.

The predefined air/fuel ratio LAMB_SP is supplied to a block B2 which includes a pre-control and generates a lambda pre-control factor LAMB_FAC_PC as a function of the predefined air/fuel ratio LAMB_SP.

Also provided is a trim controller which generates a trim signal as a function of the second measured signal. The air/fuel ratio LAMB_AV recorded by the first exhaust gas probe 42 is corrected in a linkage point VI as a function of the trim signal and in this way a corrected recorded air/fuel ratio is obtained.

In a second summation point SUM2, by formation of a difference a control difference D_LAMB which is the input variable into a block B4 is determined as a function of the predefined air/fuel ratio LAMB_SP and the corrected recorded air/fuel ratio LAMB_AV_COR. A linear lambda controller is embodied in block B4 and moreover preferably as a $PII^2D$ controller. The actuating variable of the linear lambda controller of block B4 is a lambda control factor LAM_FAC_FB.

The predefined air/fuel ratio LAMB_SP can also be subjected to filtering prior to the forming of the difference in the summation point S2.

Also provided is a block B6 in which a fuel mass MFF that is to be metered is determined as a function of a load LOAD which can be, for example, a mass air flow. A corrected fuel mass that is to be metered is determined in the multiplication point M1 by formation of the product of the fuel mass MFF that is to be metered, of the lambda pre-control factor LAM_FAC_PC and of the lambda control factor LAM_FAC_FB. The injection valve 18 is then activated accordingly for the purpose of metering the corrected fuel mass MFF_COR that is to be metered.

Figure 3:
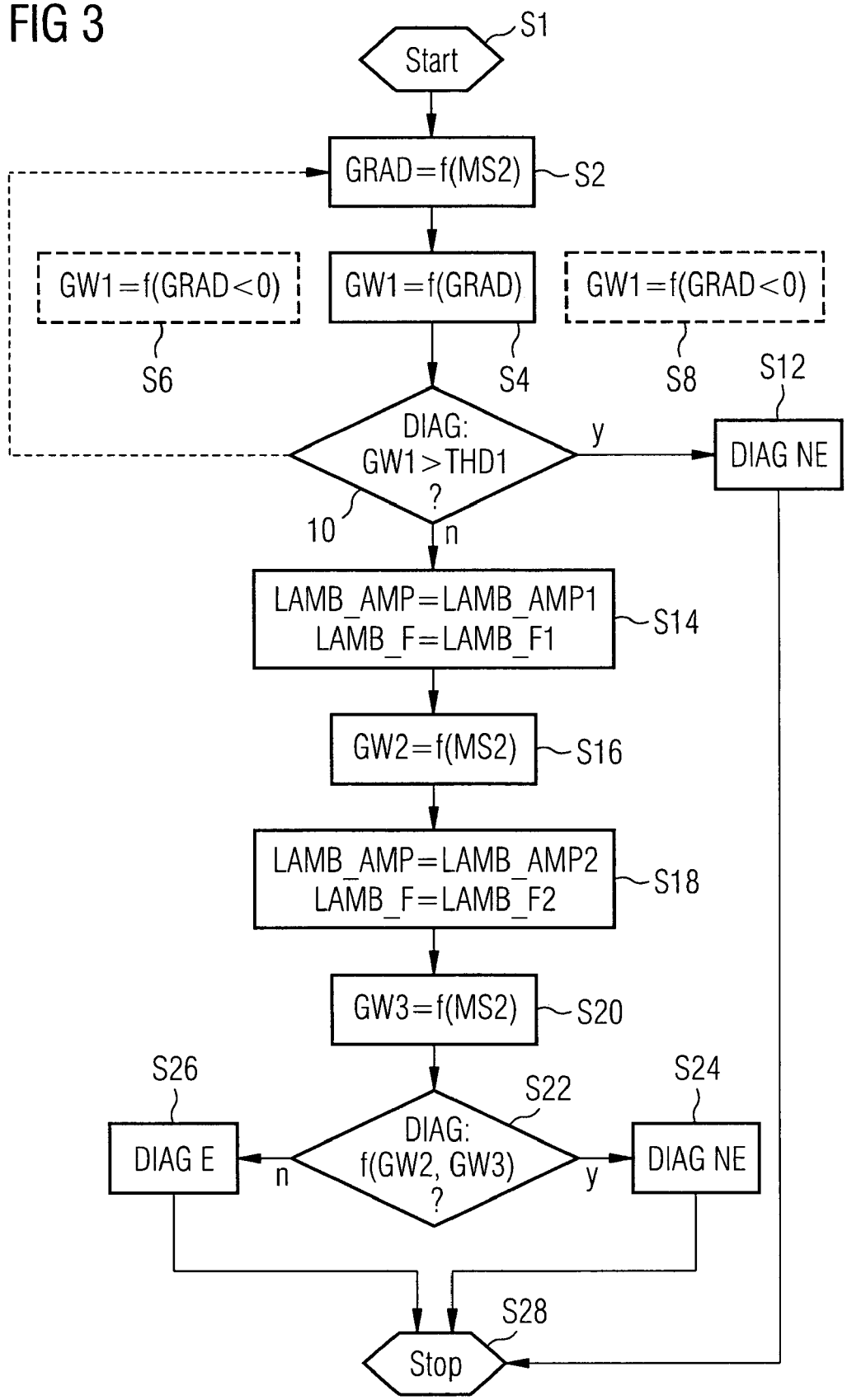
FIG. 3 is a flowchart of a program which is executed in the control device.

A program for performing a diagnosis of the second exhaust gas probe 43, which is disposed downstream of the catalytic converter 21, is stored in a memory of the control device and is executed in the control device while the internal combustion engine is in operation. The program is explained in more detail below with reference to the flowchart of FIG. 3. The program is started in a step S1. This can take place for example close in time to a starting of the internal combustion engine, or else at an arbitrary predefinable time at which a diagnosis of the second exhaust gas probe 43 is to be performed. Where applicable variables are initialized in a step S1.

A gradient GRAD of the measured signal MS2 of the second exhaust gas probe 43 is determined in a step S2.

In a step S4, a first quality value GW1 is then determined as a function of the gradient GRAD. The gradient GRAD determined in step S2 can be assigned for example directly to the first quality value GW1. It can, however, also be arbitrarily normalized for example or also, for example, be subjected to suitable filtering or the like.

A diagnosis DIAG is then performed in a step S10. A check is carried out in step S10 to determine whether the first quality value GW1 is greater than a first threshold value THD1. In this connection the first threshold value THD1 is specified in such a way that if the first quality value is greater than the first threshold value THD1, the second exhaust gas probe 43 has a sufficient signal dynamic such that it can be ensured, irrespective of catalytic converter influences, that it is capable of functioning correctly. The first threshold value THD1 can be determined empirically. The first quality value GW1 can be determined in step S4, taking into account gradients with a positive as well as a negative sign.

As an alternative to step S4 it is, however, also possible to provide a step S6 in which the first quality value GW1 is determined simply as a function of values of the gradient GRAD if the latter has values less than zero and consequently the measured signal MS2 of the second exhaust gas probe 43 has a negative slope. The first quality value GW1 is then consistently representative of the signal dynamic of the second exhaust gas probe 43 from a rich to a lean transition of the air/fuel mixture. Furthermore, a step S8 can also be provided as an alternative to step S4.

According to step S8 the first quality value GW1 is determined as a function of values of the gradient GRAD which are greater than zero. In this way the first quality value GW1 is then representative of the signal dynamic of the measured signal MS2 of the second exhaust gas probe 43 with regard to transitions from lean to rich of the mixture sensed by the second exhaust gas probe 43. Specifically a diagnosis in this respect of the second exhaust gas probe 43 is a particularly preferred area of application of the program according to FIG. 3. A first version of the program of FIG. 3 with step S6 and a second version of the program with step S8 can, of course, also be executed in the control device.

If the result obtained in step S10 is that the first quality value GW1 is greater than the first threshold value THD1, the diagnosis DIAG is reached in a step S12 that the second exhaust gas probe 43 has no errors NE. The program can then be terminated in a step S28.

In addition to the conditions specified in step S10, a further check can also be made in step S10 to determine whether a predefinable period of time has elapsed since the start of the program in step S1 or, for example, whether, since the start of the program in step S1, the internal combustion engine has been at least once in the operating condition of overrun fuel cut-off, in which the supply of fuel by the injection valves 18 is prevented and consequently, given a suitable duration of the operating condition of overrun fuel cut-off, the oxygen store of the catalytic converter 21 is completely loaded with oxygen. As a function of this additional condition in step S10 the program can then also in the event that in the check in step S10 the first quality value GW1 is not greater than the first threshold value and the further condition has not yet been fulfilled, i.e. for example the predefined period of time has not expired or analogously the operating condition of overrun fuel cut-off has not yet been assumed, the processing has been resumed again in step S2. This is the preferred embodiment of the program. In this way the diagnosis DIAG can be performed quasi continuously as a function of the gradient GRAD without intervention in the operation of the internal combustion engine.

If the condition of step S10 is not met or if the conditions of step S10 are not met, according to the above statements, the processing is continued in a step S14. In step S14, an amplitude LAMB_AMP of the forced stimulation signal is set to a first amplitude value LAMB_AMP1. A frequency LAMB_F of the forced stimulation signal is also set in step S14 to a first frequency LAMB_F1.

In a step S16, a second quality value GW2 is determined as a function of the measured signal MS2 of the second exhaust gas probe 43. Preferably, in addition, the second measured signal MS2 is integrated in relation to a reference value and, specifically, preferably over several cycles of the forced stimulation signal. The reference value is preferably specified such that it corresponds to the value of the measured signal MS2 of the second exhaust gas probe 43 in the case of a stoichiometric mixture prior to the oxidation of the fuel. The reference value can be approximately 700 mV for example. Preferably the reference value is determined from an averaging of the measured signal MS2 of the second exhaust gas probe 43 over a forced stimulation cycle. In addition, the second quality value GW2 is preferably determined also taking into account the temperature of the exhaust gas prevailing in each case in the region of the second exhaust gas probe 43 and/or the load or rotational speed that is present.

In a step S18, the amplitude LAMB_AMP of the forced stimulation signal is then set to a second amplitude value LAMB_AMP2. In addition in step S18, the frequency LAMB_F of the forced stimulation signal is also set to a second frequency LAMB_F2. Both the first amplitude value LAMB_AMP1 and the first frequency LAMB_F1 are in each case different from the second amplitude value LAMB_AMP2 and the second frequency LAMB_F2 respectively. The product of the first amplitude value LAMB_AMP1 and the first frequency LAMB_F1 is preferably equal to the product of the second amplitude value LAMB_AMP2 and the second frequency LAMB_F2.

In a step S20, a third quality value GW3 is then determined as a function of the measured signal MS2 of the second exhaust gas probe 43. This is preferably effected analogously to the procedure for determining the second quality value GW2 in step S16.

In a step S22, the diagnosis DIAG is then performed, and specifically as a function of the second and third quality value GW2, GW3. The relation between the second and third quality value GW2, GW3 is preferably determined in addition. In this way a particularly reliable separation is then possible between extrinsic catalytic converter influences and intrinsic exhaust gas probe influences. Preferably the relation thus determined is then also compared with a further predefined threshold value and, dependent on the result of the comparison, the exhaust gas probe diagnosed either as error-free NE in a step S24 or as having an error E in a step S26. In this connection the further threshold value is preferably determined empirically in such a way that it is characteristic of whether the second exhaust gas probe 43 is operating free of errors or is affected by an error.

Typically, particularly in the case of a catalytic converter 21 which still has a very good oxygen storage capacity, as can be the case, for example, with very new catalytic converters, a second exhaust gas probe 43 that is actually operating free of errors can only be recognized as such with difficulty by means of the procedure of steps S2 through S10, since owing to the good oxygen storage capacity the exhaust gas concentration in the region of the second exhaust gas probe 43 exhibits reduced low dynamics in comparison with an aged catalytic converter and consequently the measured signal MS2 of the second exhaust gas probe 43 may also not exhibit any high signal dynamics.

In this case, however, the exhaust gas probe can then nonetheless be diagnosed as very reliable by means of the refined diagnosis according to the procedure of steps S14 through S28. In particular in the case of an OBD limit catalytic converter with a second exhaust gas probe 43 which has a very greatly extended response time and consequently a less sharply falling or rising signal when there is a change in the mixture ratio, the defective exhaust gas probe can in this way be very efficiently detected and it is thus possible to prevent the catalytic converter 21, which is also actually defective, from being incorrectly diagnosed as functioning correctly.

The trim controller is preferably activated while steps S14 through S22 are being performed.

The predefined raw air/fuel ratio LAM_SP_RAW is preferably set to the stoichiometric value when steps S14 through S22 are performed.

Alternatively, while steps S14 through S22 are performed the frequency LAMB_F of the forced stimulation can be variable in each case and, for example, a changeover of the specifying of a corresponding predefined rich air/fuel ratio LAMB_SP to a corresponding predefined lean air/fuel ratio LAMB_SP and vice versa can be performed as a function of the measured signals MS1, MS2 of the first or second exhaust gas probe 42, 43. The second quality value GW2 can then be determined for example in each case in relation to the measured values during the phase during which the predefined rich air/fuel ratio is set to the first air/fuel ratio. The third quality value GW3 can then be determined for example in each case in relation to the measured values during the phase during which the predefined rich air/fuel ratio is set to the second air/fuel ratio. A similar procedure can also be followed in relation to the measured values which are determined during the phase during which predefined lean air/fuel ratios are set in each case.

The first amplitude value AMP1 is representative of the first air/fuel ratio and the second amplitude value AMP2 is representative of the second air/fuel ratio.

Figure 4:
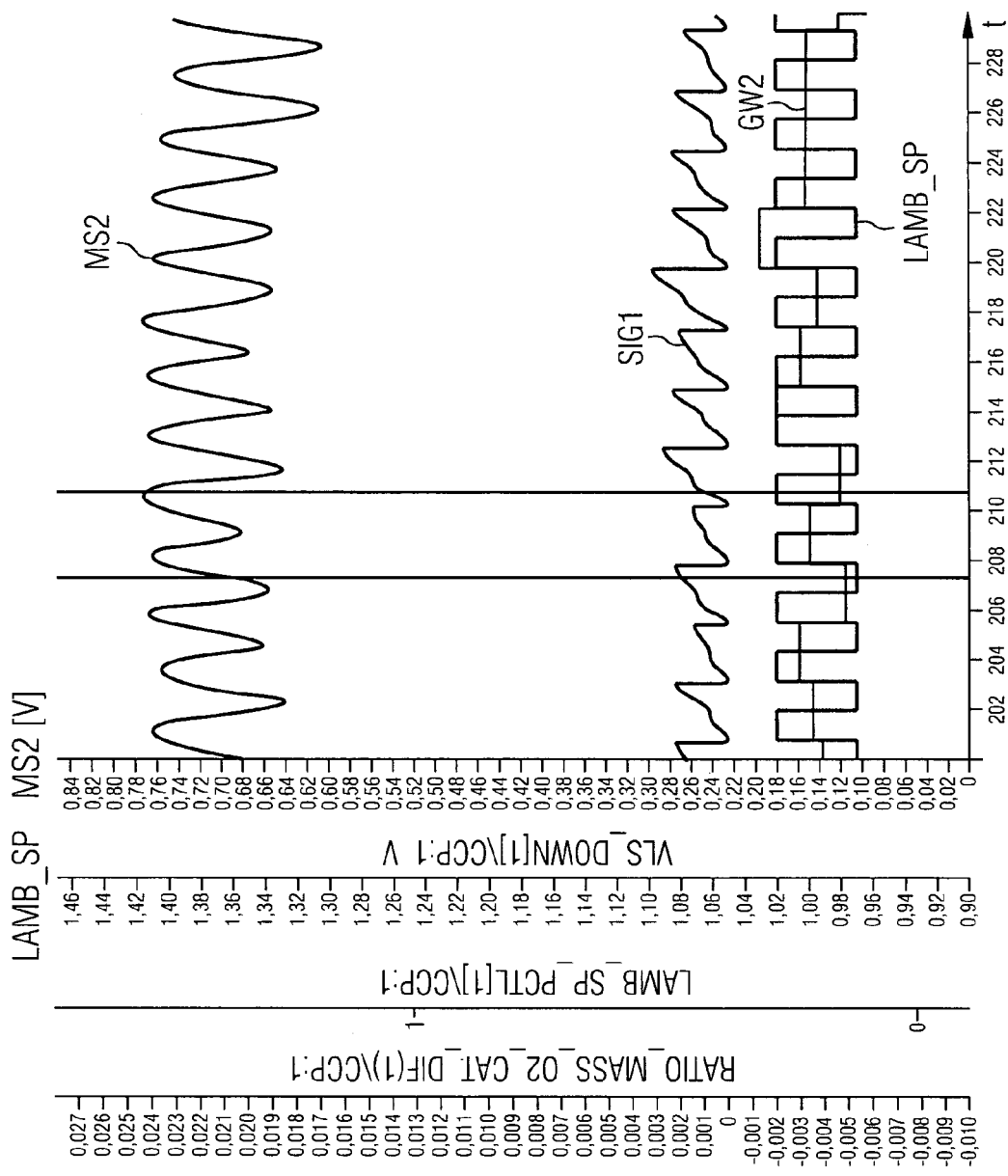
FIG. 4 shows first signal waveforms and FIG. 5 shows second signal waveforms.

FIG. 4 shows different signal waveforms plotted against the time t. In this case these are experimental results with a first amplitude value AMP1 of plus or minus 2.5 percent around the stoichiometric air/fuel ratio of an oxygen loading of 60 milligrams in the case of a defective second exhaust gas probe 43. In this case SIG1 designates the waveform of the measured signal MS2, integrated in relation to the reference value, of the second exhaust gas probe 43. The second quality value GW2 is determined as a function of the waveform SIG1 of the integrated measured signal MS2 of the second exhaust gas probe 43 and in this case is determined anew only with positive jumps in the predefined air/fuel ratio LAMB_SP as a function of these.

Figure 5:
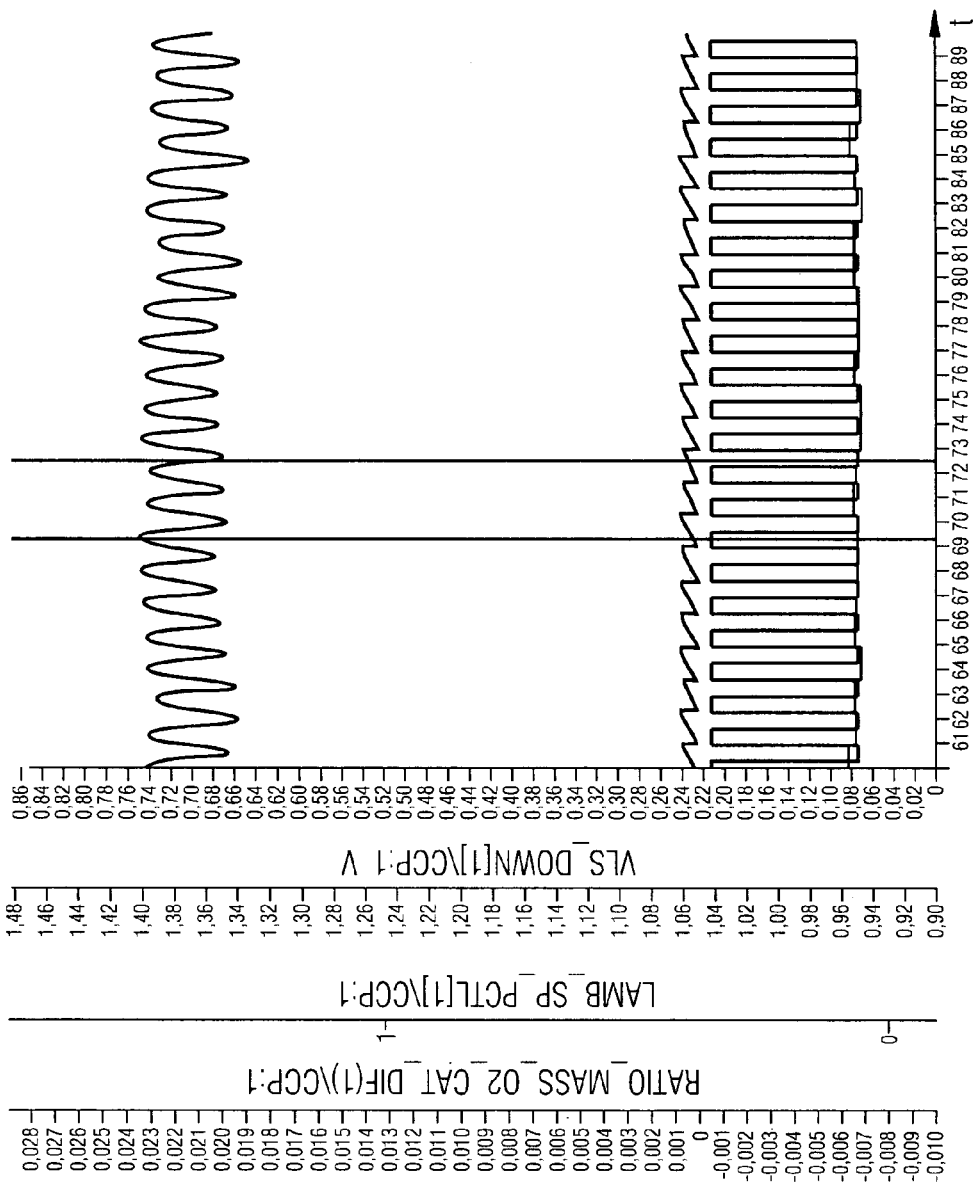

FIG. 5 shows corresponding signal waveforms for the same second exhaust gas sensor 43, with in this case the second amplitude value LAMB_AMP2, for example plus or minus 4.5 percent referred to the stoichiometric air/fuel ratio, and the second frequency LAMB_F2 being set.

It can be seen from FIG. 5 that the signal waveform SIG1 of the integrated second measured signal MS2 referred to the reference value is subject to significantly smaller fluctuations and also absolutely assumes a smaller value than that in FIG. 4. This then also leads to the third quality value GW3 essentially assuming smaller values and not being subject to such large fluctuations as the second quality value GW3.

The forming of the relation of the second and third quality values GW2, GW3 then enables a particularly good separation of extrinsic catalytic converter influences and intrinsic influences of the second exhaust gas probe 43 to be achieved and consequently the second exhaust gas probe 43 to be correctly diagnosed, in this case as having an error E.

The diagnosis according to the programs of FIG. 4 can also be used in combination with further diagnostic methods that are known to the person skilled in the art in connection with the diagnosis of the second or even the first exhaust gas probe 43, 42 or of the catalytic converter 21.

The invention claimed is:

1. A diagnostic device for an exhaust gas probe disposed downstream of a catalytic converter in an exhaust gas tract of an internal combustion engine, comprising:
   a first quality value determining device that determines a first quality value that represents a signal dynamic of a measured signal of the exhaust gas probe as a function of the measured signal of the exhaust gas probe;
   an exhaust gas probe diagnosing device that diagnoses the exhaust gas probe as functioning correctly if the first quality value represents a predefined signal dynamic;
   a catalytic converter diagnosis device that performs a catalytic converter diagnosis if the first quality value does not represent at least the predefined signal dynamic, with the catalytic converter diagnosis comprising a loading with oxygen or an emptying of oxygen with a plurality of different air/fuel ratios and, diagnoses the exhaust gas probe as functioning either correctly or incorrectly as a function of the catalytic converter diagnosis.

2. The diagnostic device as claimed in claim 1, wherein the first quality value is determined as a function of a gradient of the measured signal of the exhaust gas probe.

3. The diagnostic device as claimed in claim 1, wherein the first quality value is determined in relation to the signal dynamic of the measured signal of the exhaust gas probe for a transition of the measured signal that is representative of a transition from lean to rich of the air/fuel ratio sensed by the exhaust gas probe.

4. A diagnostic method for an exhaust gas probe arranged downstream of a catalytic converter in an exhaust gas tract of an internal combustion engine, wherein:
   determining a first quality value that represents a signal dynamic of a measured signal of the exhaust gas probe that is determined as a function of the measured signal of the exhaust gas probe;
   determining the exhaust gas probe as functioning correctly if the first quality value represents at least one predefined signal dynamic; and
   performing a catalytic converter diagnosis if the first quality value does not represent at least the predefined signal dynamic, where the catalytic converter diagnosis comprises a loading with oxygen or an emptying of oxygen at a plurality of different air/fuel ratios, and depending on the catalytic converter diagnosis the exhaust gas probe is diagnosed as functioning either correctly or incorrectly.

5. The diagnostic method as claimed in claim 4, wherein the first quality value is determined as a function of a gradient of the measured signal of the exhaust gas probe.

6. The diagnostic method as claimed in claim 5, wherein the first quality value is determined in relation to the signal dynamic of the measured signal of the exhaust gas probe for a transition of the measured signal that is representative of a transition from lean to rich of the air/fuel ratio sensed by the exhaust gas probe.

7. The diagnostic method as claimed in claim 6, wherein a predefined air/fuel ratio is determined by modulating a forced stimulation signal onto a stoichiometric air/fuel ratio, with an amplitude of the forced stimulation signal. being set to a first amplitude value and a frequency of the forced stimulation signal being set to a first frequency for the purpose of setting the first air/fuel ratio during the catalytic converter diagnosis, and with the amplitude of the forced stimulation signal being set to a second amplitude value and the frequency of the forced stimulation signal being set to a second frequency for the purpose of setting the second air/fuel ratio during the catalytic converter diagnosis, a product of the first amplitude and the first frequency being equal to a product of the second amplitude and the second frequency.

8. The method as claimed in claim 4, wherein the measured signal of the exhaust gas probe is evaluated in the course of the catalytic converter diagnosis.

9. The method as claimed in claim 8, wherein the measured signal of the exhaust gas probe is integrated in relation to a reference value in the course of the catalytic converter diagnosis.

10. The method as claimed in claim 9, wherein the measured signal of the exhaust gas probe is integrated in relation to the reference value in the course of the catalytic converter diagnosis, with a temperature of the exhaust gas in the exhaust gas tract being taken into account.

11. The method as claimed in claim 10, wherein a second quality value is determined in relation to the first air/fuel ratio in the course of the catalytic converter diagnosis and a third quality value is determined in relation to the second air/fuel ratio, and the exhaust gas probe is diagnosed as functioning either correctly or incorrectly as a function of the second and third quality value.

12. A diagnostic method for an exhaust gas probe arranged downstream of a catalytic converter in an exhaust gas tract of an internal combustion engine, wherein:
   determining a first quality value that represents a signal dynamic of a measured signal of the exhaust gas probe that is determined as a function of the measured signal of the exhaust gas probe;
   determining the exhaust gas probe as functioning correctly if the first quality value represents at least one predefined signal dynamic; and
   performing a catalytic converter diagnosis if the first quality value does not represent at least the predefined signal dynamic, where the catalytic converter diagnosis comprises a loading with oxygen and an emptying of oxygen at a plurality of different air/fuel ratios, and depending on the catalytic converter diagnosis the exhaust gas probe is diagnosed as functioning either correctly or incorrectly.

13. The diagnostic method as claimed in claim 12, wherein the first quality value is determined as a function of a gradient of the measured signal of the exhaust gas probe.

14. The diagnostic method as claimed in claim 12, wherein the first quality value is determined in relation to the signal dynamic of the measured signal of the exhaust gas probe for a transition of the measured signal that is representative of a transition from lean to rich of the air/fuel ratio sensed by the exhaust gas probe.

* * * * *